United States Patent [19]
Adams

[11] Patent Number: 5,241,776
[45] Date of Patent: * Sep. 7, 1993

[54] FISHING LINE SLIP SINKER WITH QUICK ATTACHMENT/DETACHMENT MEANS

[76] Inventor: Nicholas S. Adams, 1821 Squaw Point Rd. N., Brainerd, Minn. 56401

[*] Notice: The portion of the term of this patent subsequent to Oct. 23, 2007 has been disclaimed.

[21] Appl. No.: 849,644

[22] Filed: Mar. 6, 1992

Related U.S. Application Data

[60] Continuation of Ser. No. 518,118, May 3, 1990, abandoned, which is a division of Ser. No. 385,233, Jul. 25, 1989, Pat. No. 4,964,236.

[51] Int. Cl.⁵ .................. A01K 95/00; A01K 93/00
[52] U.S. Cl. .................. 43/44.92; 43/44.9; 43/44.91; 43/44.95
[58] Field of Search .......... 43/44.9, 44.91, 44.92, 43/44.95, 44.08

[56] References Cited

U.S. PATENT DOCUMENTS

| | | | |
|---|---|---|---|
| 2,459,287 | 12/1944 | Robins | 43/44.95 |
| 2,718,087 | 9/1955 | Cheesebrew | 43/57.2 |
| 3,280,498 | 10/1964 | Decker | 43/43.12 |
| 3,557,486 | 5/1968 | Wright | 43/44.89 |
| 4,138,795 | 2/1979 | Welle | 43/44.89 |
| 4,535,562 | 8/1985 | Fry | 43/42.49 |
| 4,819,364 | 4/1989 | Lill | 43/43.1 |
| 4,942,689 | 7/1990 | Link | 43/44.9 |
| 4,964,236 | 10/1990 | Adams | 43/44.9 |

Primary Examiner—Samuel M. Heinrich
Assistant Examiner—Rex E. Pelto
Attorney, Agent, or Firm—Dorsey & Whitney

[57] ABSTRACT

A slip sinker having a quick attachment/detachment mechanism for attaching the sinker to and detaching the sinker from a fishing line. The attachment/detachment mechanism includes a fishing line receiving eyelet, a pathway extending from the eyelet to an outer surface of the sinker and at least one restriction formed within the pathway to restrict the passage of line except through the application of a manual force. A feature of the invention also includes a weighted portion substantially encapsulated within a synthetic polymer or plastic line connection portion.

5 Claims, 3 Drawing Sheets

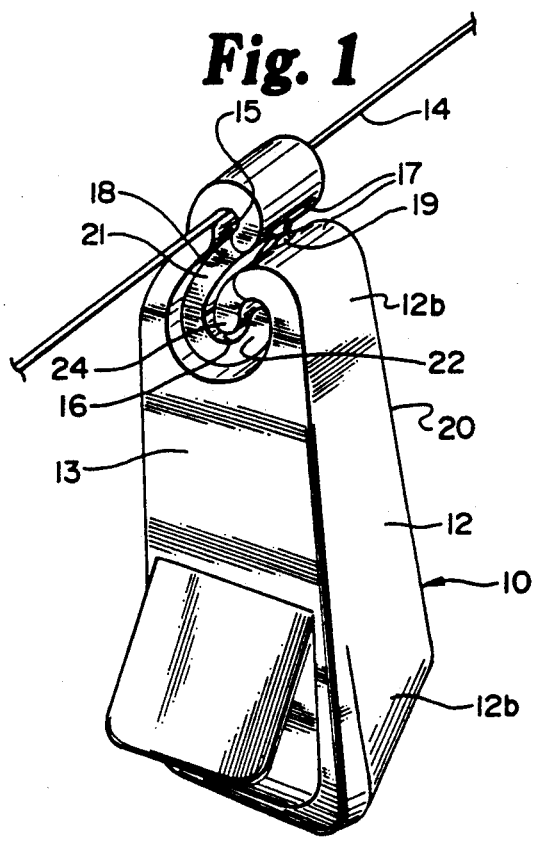
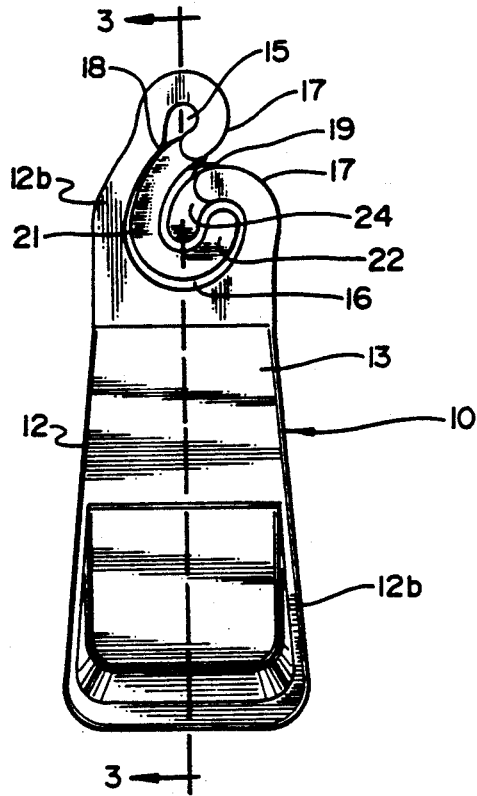
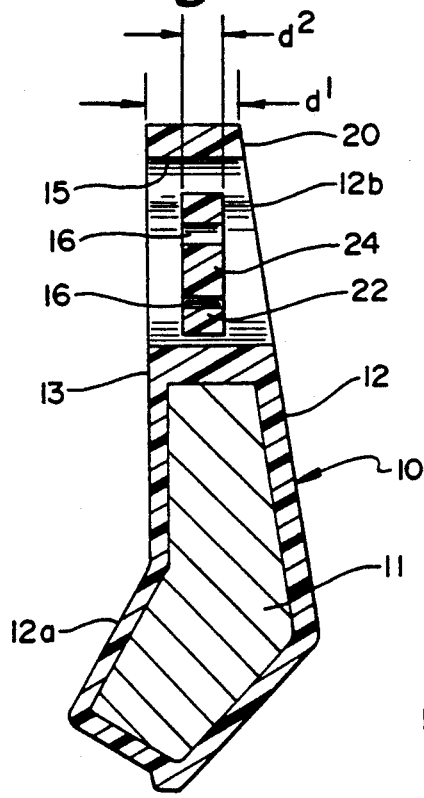
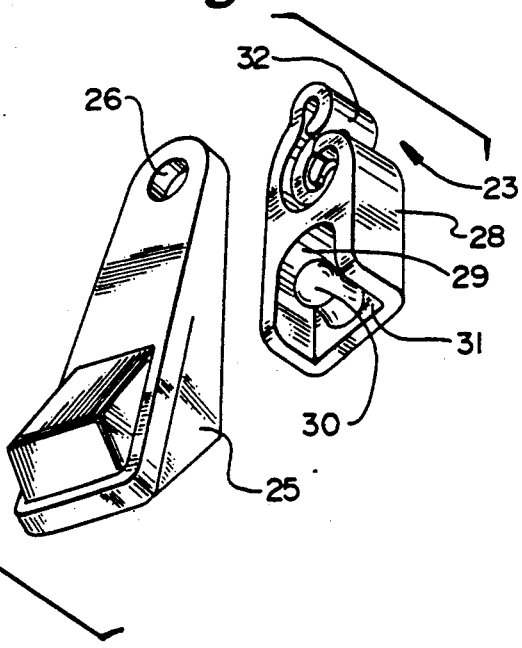

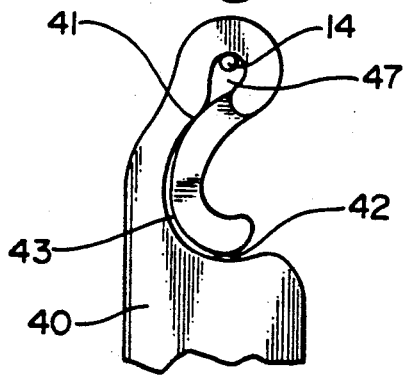
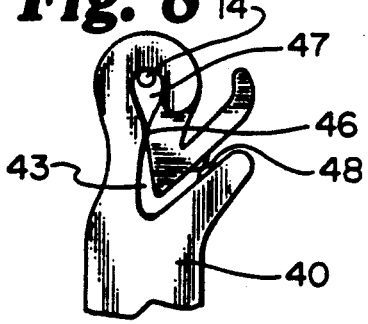
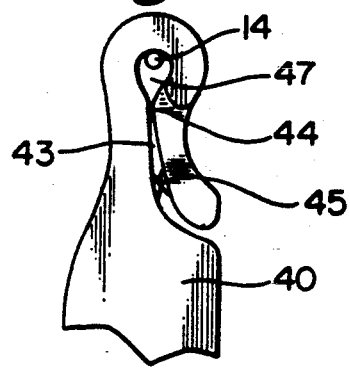
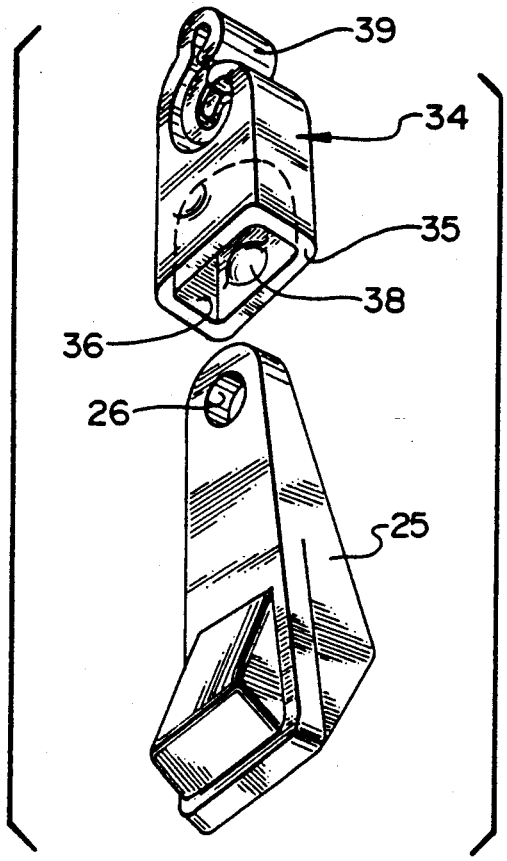
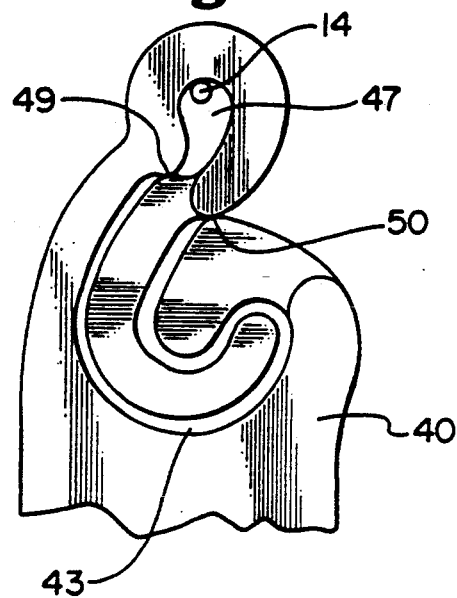

FISHING LINE SLIP SINKER WITH QUICK ATTACHMENT/DETACHMENT MEANS

This is a continuation of application Ser. No. 07/518,118 filed May 3, 1990 now abandoned, which is a divisional of Ser. No. 07/385,233 filed Jul. 25, 1989, now U.S. Pat. No. 4,964,236.

BACKGROUND OF THE INVENTION

A. Field Of The Art

The present invention relates generally to a fishing line slip sinker and more particularly to a fishing line slip sinker having a weighted portion embedded in a synthetic polymer or plastic material and having improved quick attachment/detachment means for connecting the sinker to a fishing line.

B. Description Of The Prior Art

There are, of course, a variety of sinkers or weights which are utilized by fishermen for the purpose of providing weight to a fishing line to cause the bait or lure to sink to or toward the bottom. Fishing line sinkers are generally constructed of lead or some other heavy material and are connected to the fishing line in various ways. A common method of connecting a fixed line lead sinker to a fishing line is via a "split sinker" method in which the lead body includes a slit which is simply pinched around the fishing line to retain the same to the fishing line in a fixed position. Another common fixed line sinker is a rubber core sinker in which the lead weight portion includes a rubber insert for retaining the sinker to the line.

In contrast to the fixed line sinkers described above, a further category of sinkers is a so-called slip sinker in which the fishing line is allowed to slip through a hole or eyelet provided in the sinker. A slip sinker structure allows the fish to pull the fishing line through the sinker, without resistance, during a strike, while still performing its principal function of causing the bait or lure to sink toward the bottom.

A number of slip sinker designs currently exist. These include, among others, clam shell, pyramid, bell type and walking sinkers. Most of these are provided with a hole or eyelet through which the fishing line extends. Thus, in order to attach the sinker to or detach the sinker from a line having a hook or lure connected thereto, the line must first be cut, after which the line is threaded through the eyelet of the sinker and then retied to the swivel or the lure.

Other mechanisms also exist for connecting the fishing line to a slip sinker. One of these mechanisms is illustrated in U.S. Pat. No. 3,280,498 dated Oct. 25, 1966 and issued to Decker. This patent discloses a piece of stiff frangible material which is connected with a weight element and which includes an eyelet with a means to facilitate attaching the sinker to and detaching the sinker from a fishing line without having to cut and retie the line. Another mechanism for connecting a slip sinker to a fishing line is described in U.S. Pat. No. 3,805,439 dated Apr. 23, 1974 and issued to Krengel et al. This mechanism includes a loop portion connected to a weight element and having an eye and a pliable snap by which the fishing line can be connected to the eye.

Although slip sinkers both with and without quick attachment/detachment mechanisms currently exist and have been extensively used by fishermen, there is a continued need for an improved slip sinker design and in particular a need for a slip sinker with improved means for joining the weight element with a line connecting mechanism and an improved quick attachment/detachment means for connecting the sinker to and removing the sinker from the fishing line without cutting and retying the line to the swivel or the lure.

SUMMARY OF THE INVENTION

In general the present invention relates to a slip sinker construction which is easily manufactured, and which includes, among other things, an improved mechanism for quickly attaching the fishing line to and removing the fishing line from the sinker without having to cut and retie the line.

More specifically, the slip sinker of the present invention includes a weighted portion which is molded entirely within, or selectively connectable to, a fishing line connection portion. The fishing line connection portion is formed of a synthetic polymer or plastic material and is provided with an improved quick attachment/detachment means for connecting the fishing line to and removing the fishing line from the sinker. The use of a synthetic polymer or plastic material as the line connecting portion facilitates coloring of the sinker so as to serve as a fish attractant. Also, the water in combination with the polymer or plastic material functions as a lubricant to permit the sinker to slide along the line without damaging the line. In the preferred embodiment, the quick attachment/detachment means includes a line receiving eyelet, an elongated pathway extending from the eyelet to an outer side wall of the connector portion and at least one restriction formed within the pathway to prevent the inadvertent removal of the sinker from the fishing line. In the preferred embodiment, the pathway is a generally circuitous path defined by a pair of spaced wall portions which are spaced to permit free movement of the fishing line therethrough. The pathway includes one or more restrictions with a passage dimension less than the diameter of the fishing line so that an external manual force is necessary in order to move the fishing line past the restriction.

The line receiving eyelet of the preferred embodiment is also elongated in a direction generally parallel to the fishing line. This assists in insuring proper alignment of the sinker relative to the fishing line.

In an alternate embodiment of the present invention, a connection portion is designed for selective connection to and disconnection from a conventional slip sinker. Such connection portion is provided with a quick attachment/detachment means.

Accordingly, it is an object of the present invention to provide an improved slip sinker.

Another object of the present invention is to provide an improved slip sinker having a quick attachment/detachment mechanism for connecting the fishing line to and detaching the fishing line from the sinker.

A further object of the present invention is to provide a slip sinker construction which comprises a weighted portion molded within a plastic material which includes an improved attachment/detachment mechanism.

Another object of the present invention is to provide a quick attachment/detachment mechanism for connection with a conventional slip sinker.

A further object of the present invention is to provide a slip sinker which can be colored to serve as a fish attractant.

These and other objects of the present invention will become apparent with reference to the drawings, the description of the preferred embodiment and the appended claims.

DESCRIPTION OF THE DRAWINGS

FIG. 1 is a perspective view of the preferred embodiment of the slip sinker of the present invention connected with a fishing line.

FIG. 2 is a front elevational view of the slip sinker of FIG. 1.

FIG. 3 is a sectional elevation view as viewed along the section line 3—3 of FIG. 2.

FIG. 4 is a perspective, exploded view of a first alternate embodiment of the present invention which is designed to be used with a conventional slip sinker.

FIG. 5 is a perspective, exploded view of a second alternate embodiment of the present invention which is designed to be used with a conventional slip sinker.

FIG. 6 is a fragmentary elevational view of an alternate form of the quick attachment/detachment means of the present invention.

FIG. 7 is a fragmentary elevational view of a further alternate form of the quick attachment/detachment means of the present invention.

FIG. 8 is a fragmentary elevational view of a further alternate form of the attachment/detachment means of the present invention.

FIG. 9 is a fragmentary elevational view of a still further alternate form of the attachment/detachment means of the present invention.

DESCRIPTION OF THE PREFERRED EMBODIMENT

Figure 10:
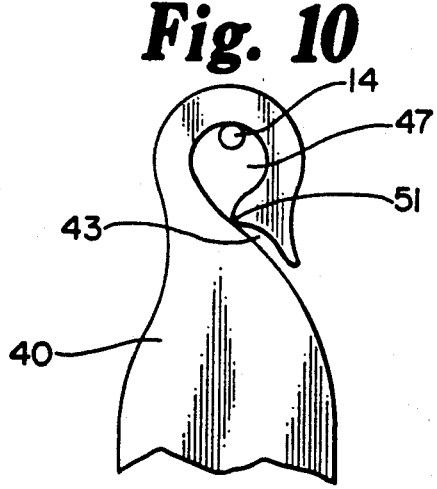
FIG. 10 is a fragmentary elevational view of a still further alternate form of the attachment/detachment means of the present invention.

The preferred embodiment of the slip sinker of the present invention is illustrated best in FIGS. 1, 2 and 3. The principal components of the slip sinker 10 of the present invention include a weighted portion 11 (FIG. 3), a plastic fishing line connection portion 12 and a quick attachment/detachment means associated with the portion 12 for connecting the slip sinker 10 to a fishing line 14. In the preferred embodiment, the quick attachment/detachment means includes a fishing line receiving eyelet 15 located near the top of the slip sinker 10, an elongated pathway 16 extending from the eyelet 15 to an outer surface of the portion 12 and at least one restriction formed in the pathway 16 to permit passage of the fishing line 14 as a result of manually forcing the line 14 past the restriction. In the preferred embodiment illustrated in FIGS. 1-3, two such restrictions are formed in the passageway 16. These restrictions include the restriction 18 which comprises a narrowed down portion of the pathway positioned adjacent to the eyelet 15 and the restriction 19 which is comprised of a pair of opposed raised portions formed on opposite walls of the pathway 16.

As best illustrated in FIG. 3, the weighted portion 11 is comprised of a heavy metal or other material which in the preferred structure is fully embedded or captured within the fishing line connection portion 12. The weighted portion 11 is preferably constructed of lead and is shaped in a configuration similar to the lower portion of slip sinker embodiments currently existing in the art.

The fishing line connection portion 12 in the preferred embodiment includes a lower section 12a (FIG. 3) which is molded around the entirety of the weighted portion 11. An insert, injection molding technique is utilized to construct the sinker 10. During the molding process, an injection mold cavity conforming to the exterior shape of the finished sinker 10 is formed and the weighted lead material 11 is supported within the mold cavity in a desired position either by a core pin or by standoff elements which are preliminarily molded into the lead portion 12. In the preferred embodiment, the mold is constructed of a tool steel material of a type commonly utilized in the injection molding art. The sinker 10 is formed by injecting the molding material into the cavity so that it flows around the weighted portion 11 and conforms to the shape of the cavity. The material from which the line connecting portion 12 is constructed is preferably a synthetic polymer or plastic material having characteristics enabling it to be molded into the shapes and configurations illustrated in the drawings and having sufficient resiliency, strength and flexibility to perform the functions of the attachment/detachment means as described below. The material from which the section 12 is constructed should also be chemically resistant to the various chemicals and other materials commonly found in a fisherman's tackle box. In the preferred embodiment, the portion 12 is constructed of a category of polymers known as polyolifins which include, among others, polypropylenes, polyethylenes and polyallomers. The specific material in the preferred embodiment of the present invention is a low density polyethylene.

The upper section 12b of the line connecting portion includes a forward face 13, a rearward face 20 and an exterior side face extending between the forward and rearward faces 13 and 20. Such side face extends in a direction generally parallel to the fishing line 14 and is defined by dimension $d^1$ as shown in FIG. 3.

The line receiving eyelet 15 extends through an uppermost portion of the upper section 12b from the rearward face 20 to the forward face 13 and in a direction generally parallel to the side face of the section 12b. In the preferred embodiment, the eyelet is elongated in a direction generally parallel to the fishing line and has a generally tear drop shaped cross-sectional configuration. The longitudinal dimension of the eyelet 15 which is defined in the preferred embodiment by the dimension $d^1$ is significantly greater than the diameter or cross-sectional dimension of the eyelet. The elongated configuration of the eyelet 15 assists in maintaining proper alignment of the slip sinker 10 relative to the fishing line 14, thereby minimizing twisting of the sinker 10 and facilitating its sliding movement up and down the fishing line 14 in the general position illustrated in FIG. 1. It is contemplated, however, that the width of the uppermost end of the upper section 12b, and thus the longitudinal dimension of the eyelet 15, could be significantly reduced without deviating from the significant advantages of the other features of the present invention. In the preferred embodiment, the longitudinal dimension of the eyelet 15 defined by the dimension $d^1$ (FIG. 3) is at least double, and preferably about three times as long as, its diameter or cross-sectional dimension.

Joining with a lower portion of the generally tear drop shaped eyelet 15 is a first end of the elongated pathway 16. This pathway 16 extends from the eyelet 15 to a second end where it joins with the outer side face of the upper section 12b. As illustrated best in FIG. 2, the pathway 16 of the preferred embodiment is a generally circuitous pathway which reverses directions approximately four times before joining with the exterior side face of the section 12b. Preferably, the pathway 16 should, between leaving the eyelet 15 and joining the outer surface of the section 12b, pass through an arc of at least about 90°. The elongated pathway is defined by a pair of spaced wall portions which are spaced apart a distance greater than the diameter of the fishing line 14 for which the sinker 10 is designed. This spacing permits the fishing line 14 to freely pass through the pathway 16 as a result of manual movement.

It is contemplated that different sizes of sinkers will be used in different applications and with different sizes of fishing line. Thus, the dimensions of the pathway 16 will similarly vary. For example, if the sinker 10 is designed for use with a fishing line of approximately 12 pound test, which has a line diameter depending on the manufacturer, of approximately 0.012 inches, the width of the pathway 16 should be greater. Preferably, for fishing line of 12 pound test, the pathway width should be 0.012-0.015 inches.

In the preferred embodiment, one of the pair of spaced wall portions which defines the pathway 16 is comprised of an inner surface of the upper section 12b, and that the other of the pair of spaced wall portions defining the pathway 16 is comprised of an outer surface of a curved neck portion 21. As illustrated best in FIG. 2, the curved neck portion 21 includes a lower hook portion 22 which cooperates with an upper hook portion 24 integrally formed with the upper section 12b to define the generally circuitous pathway 16. As illustrated in FIGS. 1-3 and particularly in FIG. 3, the width $d^2$ of the curved neck portion 21 and the forward end of the upper hook portion 24 has a reduced thickness which is approximately one half to one third the thickness of the section 12b. Preferably, the thickness of the portion 21 should be less than one half the thickness of the upper section 12b. This reduced thickness enables the fishing line 14 to be more easily connected to and disconnected from the slip sinker 10 and also reduces, if not eliminates, the possibility of vegetation catching in the pathway during use.

The length of the pathway 16 should preferably be significantly longer than its width. As shown in FIGS. 1-3, as well as in the alternate embodiments of FIGS. 6-11, the length of the elongated pathway (numeral 16 in FIGS. 1-3 and numeral 43 in FIGS. 6-11) is many times greater than its width. For the construction of these embodiments, the pathway should be at least twice as long as it is wide and preferably at least five times as long as it is wide.

In the preferred embodiment of the present invention, one or more restrictions are formed in the elongated pathway 16 so as to permit passage of the fishing line past such restriction only as a result of the application of manual force. This prevents the slip sinker 10 from becoming inadvertently disconnected from the fishing line 14 as a result of casting, trolling, encountering turbulent water, becoming snagged, or the like. At least one of these restrictions should preferably be located closely adjacent to the eyelet 15. It is contemplated that a variety of means can be utilized to form the restrictions in the pathway 16. One means is illustrated by the restriction 18 shown in FIGS. 1 and 2 which comprises a relatively gradual narrowing of the distance between the wall portions defining the pathway 16 to a point where the distance between such wall portions is less than the diameter of the fishing line 14. This exact dimension will, of course, depend on the size of fishing line for which the sinker is designed. For example, a sinker designed for use with approximately a 12 pound test line (having a diameter of approximately 0.012 inches) should have a smaller restriction width and preferably a width of about 0.004 inches or less.

The restriction illustrated by reference numeral 19 is comprised of a pair of opposed bumps or raised portions formed on the respective wall portions defining the pathway 16 so that such raised portions form an interference with one another when the slip sinker 10 is in its normal, unstressed position. Although the preferred embodiment shows a pair of opposed raised portions or bumps on opposite wall portions of the pathway 16, it is contemplated that a single bump or raised portion extending above the surface of only one of the wall portions could be utilized as well. Similar to the restriction 18, the distance between the bumps or raised portions of the restriction 19 is less than the diameter of the fishing line 14 so that a manual force is needed to move the line 14 past the restriction.

As shown in FIGS. 1 and 2, a pair of lead-in surfaces 17, 17 are provided on the outside surface of the section 12b. These surfaces 17, 17 facilitate insertion of the fishing line 14 into the pathway 16.

The preferred embodiment of FIGS. 1-3 contemplates the weighted portion 11 to be molded or encapsulated entirely within the plastic line connection portion 12. This enables the entire sinker 10 to be colored, thus also functioning as a fish attractant.

The alternate embodiments of FIGS. 4 and 5 contemplate a slip sinker device in which the line connection portion is designed for connection with a conventional slip sinker currently available in the market or with a separately marketed weighted portion. In the alternate embodiment of FIG. 4, a line connecting attachment 23 is adapted for connection to a conventional slip sinker 25 having an upper eyelet opening 26. The plastic connection portion 23 of FIG. 4 is provided with a lower section 28 having means for connecting the portion 23 to the slip sinker 25. This means includes a rearward wall portion 31, a connection post 30 extending forwardly from the rear wall 31 and a cavity 29 defined by an inner wall portion and surrounding the post 30 to mate with an upper and outer surface of the slip sinker 25. In the preferred embodiment, the post 30 is adapted for insertion into and through the sinker eyelet 26 and includes a rearward neck portion integrally formed with the wall portion 31 and a forward ball shaped portion of increased diameter to retain the sinker 25 in secure connection with the portion 23. To connect the sinker 25 to the portion 23, the forward end of the post 30 is aligned with the rearward side of the sinker eyelet 26 and the sinker is manually forced over the enlarged outer end of the post so that the top end of the sinker 25 nests within the cavity 29. The upper end of the portion 23 is provided with a quick attachment/detachment means 32 similar to that illustrated in FIGS. 1-3. The material from which the portion 23 is constructed is preferably of a synthetic polymer or plastic material similar to that from which the portion 12 of FIGS. 1-3 is constructed.

FIG. 5 is a further embodiment of a line connection portion 34 adapted for connection to a conventional slip sinker 25. The embodiment of FIG. 5 includes a sinker receiving cavity 36 formed in a lower end of the portion 34 and defined by a peripheral wall 35. The interior configuration of the cavity 36 is designed to conform substantially to the upper end of the sinker 25 so as to retain the same therein in a relatively tight fit. A raised portion or bead 38 is formed on one or both of the rearward and forward portions of the wall 35 within the cavity 36 to mate in a securing manner with the sinker eyelet 26.

When using the portion 34 illustrated in FIG. 5, the portion 34 is manually forced over the top end of a conventional slip sinker 25 until the bead 38 engages with the eyelet 26. Similar to the portion 23 of FIG. 4 and the portion 12 of FIGS. 1-3, the portion 34 of FIG. 5 is preferably constructed of a synthetic polymer, plastic or similar material. The top end of the portion 34 is provided with a quick attachment/detachment means similar to that illustrated in FIGS. 1-3.

FIGS. 6-11 illustrate various alternate embodiments of a quick attachment/detachment means of the type contemplated by the present invention. In each of these figures, the upper end of the line connecting portion 40 includes a line receiving eyelet 47 for receiving a fishing line 14, an elongated pathway 43 extending from the eyelet 47 to an outer surface of the portion 40 and at least one restriction. In FIG. 6, the restriction 41 comprises a narrowed pathway 41 positioned adjacent to the eyelet 47, while the restriction 42 comprises a single bump or raised portion formed on one wall of the pathway 43. The restriction 42 is adjacent to the outer surface of the portion 40.

In FIG. 7, the restriction 44 includes a narrowed pathway portion adjacent to the eyelet 47, while the restriction 45 includes a pair of raised portions or bumps opposing one another at a position near the outer surface of the portion 40.

FIG. 8 illustrates a restriction 46 comprised of a narrowed portion of the pathway adjacent to the eyelet and the restriction 48 comprises a pair of raised portions or bumps formed at a position near the outer surface of the portion 40.

FIG. 9 includes a raised portion 49 comprised of a narrowed down portion of the pathway at a position adjacent to the eyelet 47, while the restriction 50 also includes a narrowed portion of the pathway at a position adjacent to the outer surface of the portion 40.

FIG. 10 illustrates a single restriction formed by the raised portion 51 adjacent to the eyelet 47. The pathway 43 in FIG. 10 extends from the eyelet 47 at a generally 45° angle to the outside surface of the portion 40.

Figure 11:
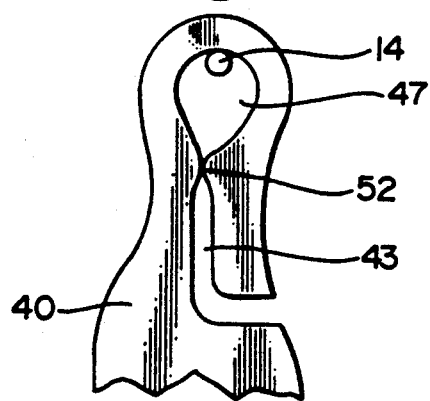
FIG. 11 is a fragmentary elevational view of a still further alternate form of the attachment/detachment means of the present invention.

FIG. 11 also is provided with a single restriction comprising the narrowed portion 52 adjacent to the eyelet 47. The pathway 43 in FIG. 11 extends generally vertically downwardly from the eyelet 47 and then at generally right angles to the outside surface of the portion 40.

As described above, one feature of the present invention includes the substantially complete encapsulation of the weighted portion within a synthetic polymer material forming the line connection portion. This feature can be utilized in combination with a variety of different quick attachment/detachment structures. A further such structure is illustrated in FIGS. 12 and 13.

Figure 12:
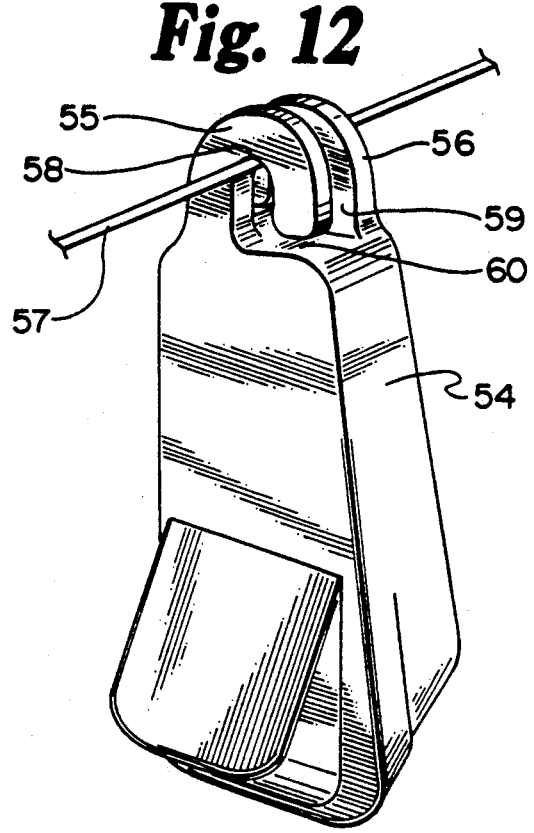
FIG. 12 is a perspective view of a further alternate form of an attachment/detachment means of the present invention.
Figure 13:
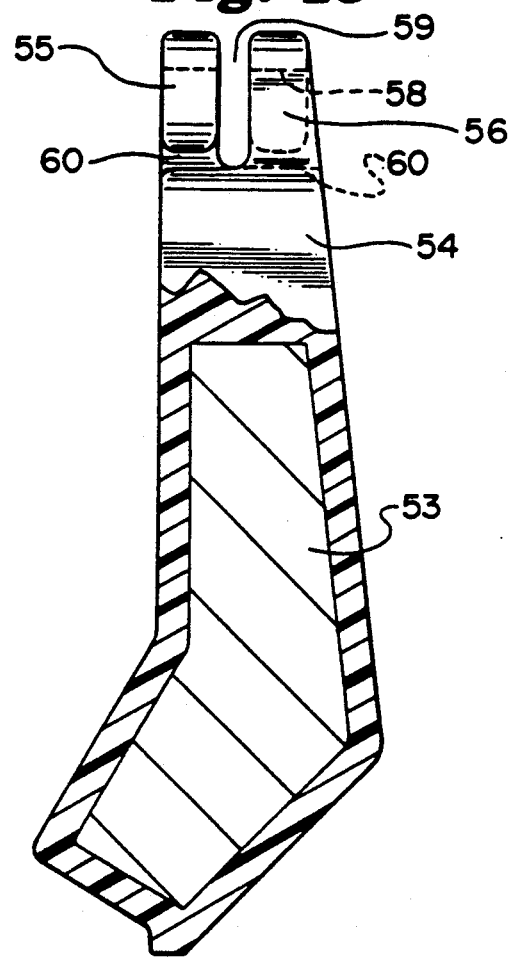
FIG. 13 is a side elevational view, partly in section, of the slip sinker of FIG. 12.

In FIGS. 12 and 13, the weighted portion 53 is totally encapsulated within the line connecting portion 54. The quick attachment/detachment structure of the embodiment of FIGS. 12 and 13 includes a pair of spaced reverse hook portions 55 and 56. As illustrated best in FIG. 13, the hook portions are laterally spaced from one another by the dimension 59 and each of the distal ends of the hook portions 55 and 56 is spaced from the body of the portion 54 by the dimension 60. Each of the hooks 55 and 56 also includes an internal eyelet portion 58 for supporting the sinker relative to the fishing line 57. In FIG. 13, the reference character 58 is directed to the broken line which defines the top end of the eyelet. In the drawings of FIGS. 12 and 13, the dimension 60 is illustrated as being greater than the diameter of the fishing line 57 to which the sinker is connected. It is contemplated, however, that the dimension 60 could be reduced so as to be less than the diameter of the fishing line 57. This would result in the formation of a restriction so as to further inhibit the sinker from being inadvertently dislodged from the fishing line 57 and require a manual force for attachment and detachment.

To attach the fishing line 14 to the slip sinker 10 of FIGS. 1-3, the line 14 is positioned at the lead-in surfaces 17, 17 and manually forced past the restriction 19. The line is then manually moved along the pathway 16 and forced past the restriction 18 into the eyelet 15. To detach the line 14 from the sinker 10, the above procedure is reversed.

To attach the fishing line 57 to the slip sinker of FIGS. 12 and 13, the line 57 is positioned between the hook portions 55 and 56 in the space 59 (FIG. 13). The sinker is then rotated 90° and the line 57 is allowed to nest within the eyelet portions 58. If the reverse hook portions 55 and 56 are constructed so that the dimension 60 is less than the diameter of the line 57, manual force is needed to move the fishing line past such restriction.

Although the description of the preferred embodiment has been quite specific, it is contemplated that various modifications could be made without deviating from the spirit of the present invention. Accordingly, it is contemplated that the present invention be dictated by the appended claims rather than by the description of the preferred embodiment.

I claim:

1. A slip sinker for quick attachment to and detachment from a fishing line comprising:
a weight member; and
a one piece body molded from a synthetic polymer material, said body including a weight encapsulating portion and a fishing line connecting portion comprising a quick attachment/detachment means for selective attachment to and detachment from a fishing line, said weight member being encapsulated entirely within said weight encapsulating portion and said quick attachment/detachment means having an outer surface, being fully molded from said synthetic material and having a fishing line receiving eyelet, said eyelet being separate from and spaced from said weight member and having a passage allowing a fishing line to run therethrough with a passage axis extending in a direction generally parallel to said line as it passes through said passage, and said quick attachment/detachment means further having an elongated, molded pathway extending from said eyelet to said outer surface, said pathway being oriented to allow said line to follow said pathway in generally parallel alignment with said passage axis during said attachment and detachment, said weight encapsulating portion and said fishing line connecting portion being fully molded from said synthetic material as a single piece and being substantially free of any exterior coating.

2. The slip sinker of claim 1 wherein said quick attachment/detachment means facilitate attachment of said fishing line to and detachment of said fishing line from said eyelet without cutting or retying said fishing line.

3. The slip sinker of claim 2 wherein said eyelet is separate from and spaced from said weight member.

4. A one-piece, fully molded slip sinker for quick attachment to and detachment from a fishing line comprising:

a fully molded, one-piece body formed from a synthetic polymer material, said body having a first portion and a second portion having first and second outer surfaces, respectively, said first and second outer surfaces being continuous with one another and forming the outer surface of said slip sinker;

a weight member fully encapsulated within said first portion of said body;

a quick attachment/detachment means fully molded in said second portion of said body for quick attachment to and detachment from a fishing line, said quick attachment/detachment means being formed solely from said synthetic polymer material and separate from said weight member; and a fishing line receiving eyelet forming a portion of said quick attachment/detachment means and being fully molded in and extending only through said second portion of said body, whereby said quick attachment/detachment means facilitates attachment of said fishing line to and detachment of said fishing line from said eyelet without cutting or retying said fishing line.

5. The slip sinker of claim 4 wherein said body is substantially free of any exterior coating.

* * * * *